United States Patent [19]
Sowell et al.

[11] Patent Number: 5,074,673
[45] Date of Patent: Dec. 24, 1991

[54] LASER-BASED TARGET DISCRIMINATOR

[75] Inventors: Peggy J. Sowell, Marriottsville; William H. Renwick, Arnold; Jonathan B. Hammer, Laurel; Dale R. Logan, Bowie, all of Md.

[73] Assignee: Westinghouse Electric Corp., Pittsburgh, Pa.

[21] Appl. No.: 636,528

[22] Filed: Aug. 1, 1984

[51] Int. Cl.$^5$ .......................... G01C 3/08; G06K 9/46
[52] U.S. Cl. ........................................ 356/5; 358/109; 382/19; 382/21; 382/22; 382/25; 382/43
[58] Field of Search .............. 356/5; 358/109; 382/19, 382/21, 22, 25, 43

[56] References Cited

U.S. PATENT DOCUMENTS

| 3,604,803 | 9/1971 | Kahn | 356/5 |
| 3,897,150 | 7/1975 | Bridges et al. | 358/109 |
| 4,206,441 | 6/1980 | Kondo | 382/21 |
| 4,267,562 | 5/1981 | Raimondi | 358/109 |
| 4,380,391 | 4/1983 | Buser et al. | 356/5 |
| 4,490,851 | 12/1984 | Gerhart et al. | 382/43 |
| 4,518,256 | 5/1985 | Schwartz | 356/5 |
| 4,545,067 | 10/1985 | Juvin et al. | 382/21 |

Primary Examiner—Stephen C. Buczinski
Attorney, Agent, or Firm—W. G. Sutcliff

[57] ABSTRACT

A laser-based target discriminator system for discriminating desired objects from other objects and clutter in an image scene is disclosed. The system is operative to scan a pulsed laser beam a plurality of times across an image area, the scans covering different juxtaposed strip portions of the image area. Range differential signals are derived from the sensed information of successive laser pulsed echoes of each scan corresponding to the image elements thereof. From the range differential signalling, a binary image map of the image area is generated and converted into a second topological image map having index codes which are derived from predetermined groupings of the binary values of the first image map. Clusters of contiguous image elements are identified from the second image map based on the derived codes of the indices thereof. Desired clusters may be discriminated from the identified clusters based on measured predefined parameters thereof. More specifically, predetermined cluster parameters of at least one known object may be stored in the discriminator system for correlation with the measured parameters of the identified clusters to discriminate the cluster of clusters corresponding to the known object. The position and orientation of the desired object may also be determined by the measured predefined parameters of the clusters and the correlation process associated therewith.

14 Claims, 10 Drawing Sheets

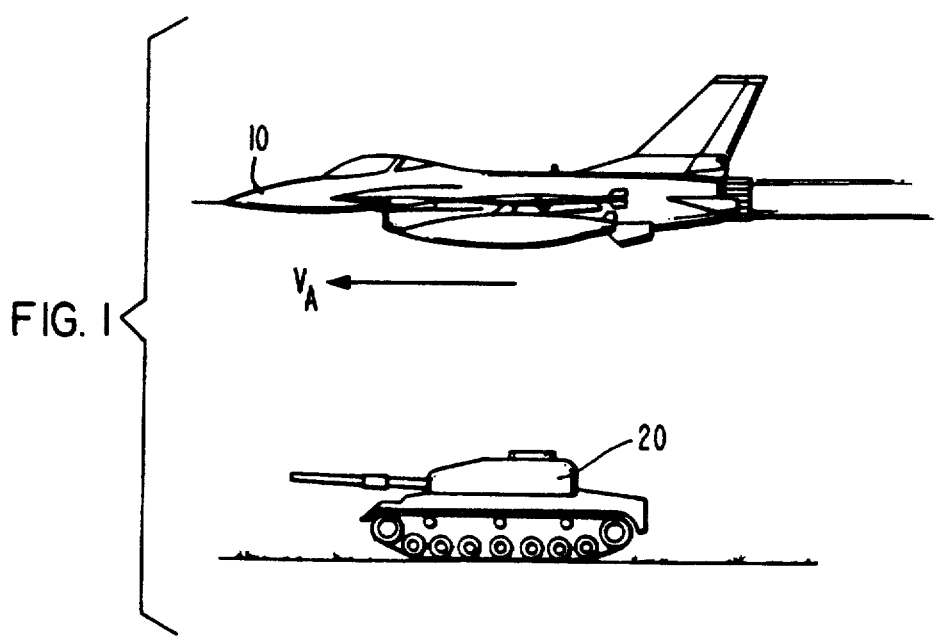
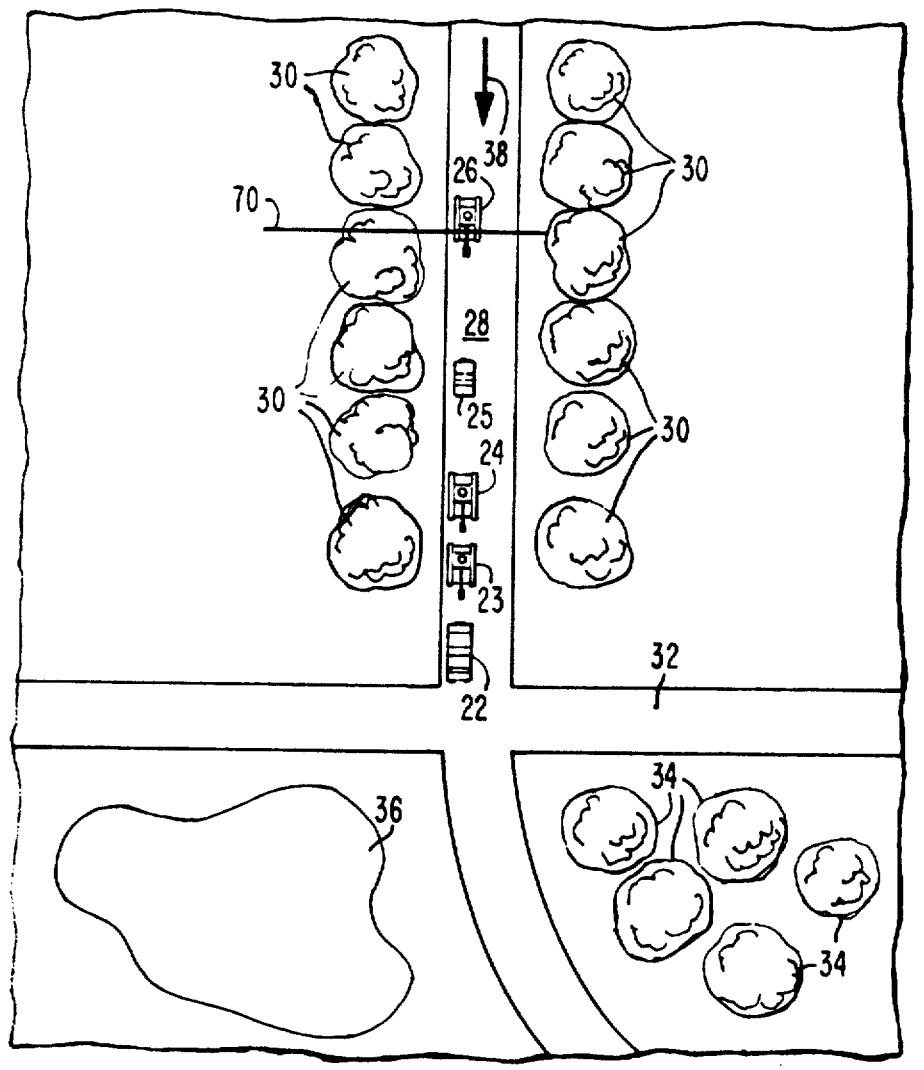

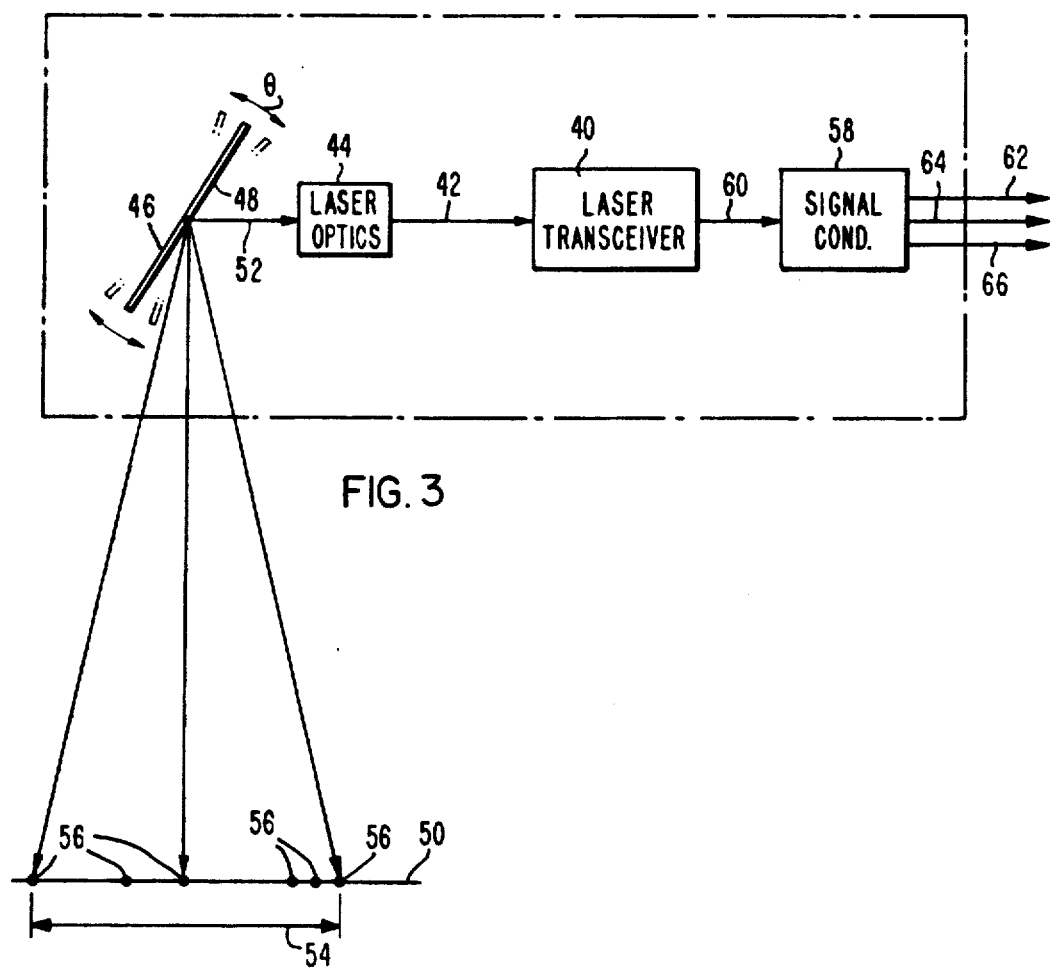

LASER-BASED TARGET DISCRIMINATOR

BACKGROUND OF THE INVENTION

The present invention relates to target sensing systems, in general and more particularly to a laser-based target discriminator which performs complicated signal processing tasks for the detection and identification of targets from the sensed laser information of a plurality of laser beam scans of an image scene.

Today, laser-based sensor systems have found wide spread applications as sensing units in both the military and commercial fields. In the military area, laser sensory units have known uses as range finders for weapon delivery enhancement on board a tactical aircraft, for example. Commercially, laser sensory units have known uses as sensory apparatus for robotic equipment in the performance of certain manufacturing tasks. While these laser-based sensor systems are capable of performing their presently required tasks, they may not be as capable of performing pressing greater demands being made with regard to more complex tasks at higher processing speeds.

For example, modern tactical aircraft which employ survivability techniques such as low altitude flying with high speed ingress and egress to and from the target area of interest generally demand weapon delivery on multiple targets on a single pass. In order to achieve this goal, a laser-based target sensor system must be capable of collecting laser information of the scene as the aircraft sweeps across it and processing the information in real time so as to detect and identify targets for weapon delivery during the single pass. Similarly, in a modern conveyor belt assembly line manufacturing process, for example, it is proposed that part selection and/or rejection tasks be performed automatically using laser-based sensors and robotic apparatus controlled in accordance with the sensed laser information. Parts may be removed from the conveyor belt by a robotic arm, for example. Generally, the robotic gripper portion of the arm requires knowledge of the conveyor belt part orientation so as to align its grasp about the part in a predefined manner. Under these constraints, the laser-based sensor system must also be capable of collecting the image information of the conveyor belt area which may be moving at moderate rates and processing the image information in real time to position the robotic arm and associated gripper portion thereof with the proper orientation to grasp and remove the part from the conveyor belt assembly line.

From both of the above application examples, it appears to be of paramount importance to process the sensed information collected by the laser sensor in real time before the aircraft has flown past the target of interest or before the part or parts have moved past the pickup point on the conveyor belt. Needless to say, this is not an easy demand on a laser-based sensor system because of the amount of sensed information being collected, the speed at which the sensed information is being collected and the complexities involved in discriminating desirable images from other portions of the laser scene and in determining the position and orientation of the object represented by the desired image. Nonetheless, the instant disclosure describes a preferred embodiment of a laser-based target discriminator system for performing such tasks with convenience and at relatively low cost by taking advantage of a conventional range measuring and scanning laser beam sensory system and complementing it with electronic apparatus for the real time processing of the scanned, laser sensed information collected thereby.

SUMMARY OF THE INVENTION

A laser-based target discriminator system includes apparatus for transmitting and sensing a pulsed laser beam, and apparatus for scanning the pulsed laser beam a plurality of times across an image area. The beam scans cover different juxtaposed strip portions of the image area. Differential signals are derived from the sensed information of successive laser pulse echoes of each scan wherein each differential signal corresponds to an image element of a scan.

In accordance with the present invention, the system includes a processor unit for processing the derived differential signals. The processing unit generates a first image map of the image area by assigning values to the differential signals of the image elements of the plurality of scans in accordance with a plurality of threshold settings. The first image map is converted into a second image map of indices corresponding to the image elements of the first image map. Each index of the second image map represents a code which is derived from a grouping of assigned values of the first image map. Clusters of contiguous image elements are identified from the second image map based on the derived codes of the indices thereof. The processor further measures predefined parameters of each of the identified clusters and discriminates desired clusters from the identified clusters based on the measured parameters thereof. The desired clusters are representative image objects of potential targets in the image area.

More specifically, the second image map comprises rows of index codes, adjacent rows respectively corresponding to successive laser scans of the image area. Each image code of a row corresponds to an image element of the image area. Corresponding image elements of the adjacent rows form columns of the second image map. A decoder may be included in the processor for sequentially decoding the index codes of each row of the second image map to detect the image elements of a row corresponding to the leading and falling edges of a cluster and to detect the rows corresponding to the beginning and end of a cluster. The aforementioned detected information may be processes for an identified cluster to measure predefined parameters thereof including the number of rows encompassing the cluster, the maximum number of image elements in a row of the rows of the cluster, and the number of image elements of the cluster. The measured parameters of the identified clusters of the image area may be correlated with stored cluster parameters of at least one known object to discriminate one or more clusters corresponding to the known object. It is also possible in the correlation process to determine the position of the discriminated cluster in the image scene and to further determine the orientation thereof based on the variety of stored predetermined cluster parameters.

BRIEF DESCRIPTION OF THE DRAWINGS

FIGS. 1 and 2 are illustrations depicting an exemplary environment for one application of a laser-based target discriminator system suitable for embodying the present invention.

FIG. 3 is a block diagram schematic illustration of a suitable laser range measuring device and scanner suitable for use in laser-based target discriminator system.

FIG. 10 offers the illustrations A through D which are used to describe one technique for converting the binary image map of FIG. 9A into the topological image map of FIG. 9B suitable for use in the processor embodiment of FIG. 6.

DESCRIPTION OF THE PREFERRED EMBODIMENT

Figure 4:
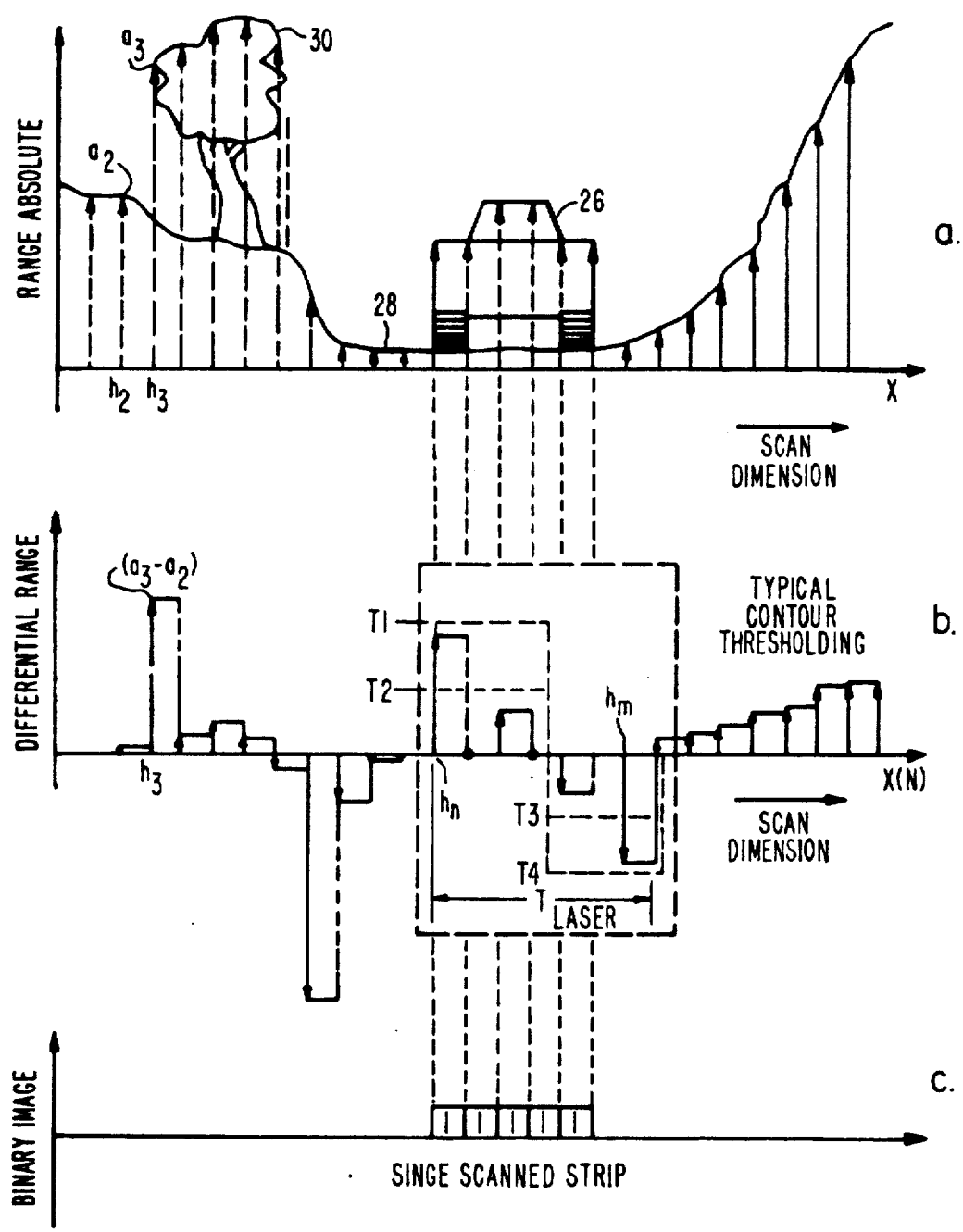
FIG. 4 provides the graphs a, b and c for use in describing one aspect of the processing of a laser-based target discriminator.

FIGS. 1 and 2 are illustrations depicting an exemplary environment for one application of a laser-based target discriminator system. FIG. 1 depicts a modern tactical aircraft 10 flying over an armored vehicle 20 in a target area of interest. The aircraft 10 is flying at a low altitude of a few hundred feet or so and at a very high velocity designated by the arrow $V_A$. The laser based target discriminator system may be embodied on-board the aircraft 10 for scanning the target area including the armored vehicle 20 with its laser beam. This will be described in greater detail in connection with FIG. 3.

The illustration of FIG. 2 depicts an exemplary scenario in which a column of vehicles denoted by the blocks 22 through 26, is traveling along a road 28 which has a row of trees 30 on either side thereof. An intersecting road 32, an additional clump of trees 34, and a lake 36 are also shown in the plan view of FIG. 2. In this scenario, the aircraft 10 has a flight direction over the road 28 designated by the arrow 38. The target area of interest includes primarily the roadway 28 and the vehicles 22 through 26. In the present example, the blocks 23, 24 and 26 designate armored vehicle targets for weapon delivery. The block 22 may be a truck and the block 25 may designate a jeep. The intention is to control the aircraft to fly with a single pass over the target area of interest at low altitude and high speed, to identify the ground targets from the ground clutter, and to discriminate the armored vehicles from the other vehicles for weapon delivery purposes during the single pass. The laser based target discriminator system embodied on board the aircraft 10 is used to achieve this goal.

More specifically, the laser-based target discriminator system may include a laser range measuring device and a scanner similar to the apparatus shown by the block diagram schematic illustration of FIG. 3. The laser range measuring portion comprises a conventional laser transceiver 40 for transmitting and sensing a pulsed laser beam along an axis designated by the line 42. The scanner portion may comprise a conventional set of laser optics 44 and a rotatable mirror 46. The laser optics 44 directs the laser beam 42 to the mirrored surface 48 for reflection therefrom to a target area designated in part by the solid line 50. Accordingly, as the mirror 46 rotates through an angle 8, the laser beam designated by the line 52 may be scanned across a strip of the target area denoted by the dimension 54. Oscillating the mirror 46 through the angle $\theta$ causes the laser beam to scan back and forth across a plurality of ground strips of the target area.

In addition, the laser beam is pulsed at a pulsed repetition frequency (PRF) with each laser beam pulse hitting the target area at a different point along the scanned strip. The target area hits associated with the PRF are denoted by the dots 56 along the dimensioned scan 54. With each hit 56, the pulsed laser beam is reflected back to the laser transceiver 40 via mirror 46 and laser optics 44. A conventional signal conditioning circuit 58 operates on the received pulsed laser information 60 from the laser transceiver 40 to provide a signal 62 representative of the absolute range at each hit, a signal 64 representative of the hit-to-hit differential range and a trigger signal 66 which provides a pulsed signal corresponding to each hit. These output signals 62, 64 and 66 will be better understood from the description of the diagrams of FIG. 4 found herebelow.

Referring to FIG. 4, the graph of FIG. 4a represents absolute range laser information across a scanned strip of the ground target area such as that shown by the line 70 in the exemplary plan view of FIG. 2. The arrowed lines represent laser hits across the scanned strip. The height of each arrow in the graph of FIG. 4a is representative of the absolute range of each hit subtracted from some reference-range which may be the absolute range to some determined ground plane, for example. The graph of FIG. 4b includes arrowed lines representing corresponding ground hits during the same scan of the strip 70. However, the amplitudes of the arrows in the graph of FIG. 4b are representative of the hit-to-hit range differential. For example, referring to FIG. 4a, the amplitude $a_2$ at hit $h_2$ is subtracted from the amplitude $a_3$ at hit $h_3$ to yield the differential range signal ($a_3 - a_2$) at hit $h_3$ in the graph of FIG. 4b. In this manner, the remainder of the range differential signaling for each hit $h_i$ of the scanned strip is formed.

Using the above-described operational technique, the laser range measurement system may scan the pulsed laser beam a plurality of times across the target area of interest (see FIG. 2) with successive beam scans covering different juxtaposed strip portions of the target area. Examples of the laser differential data formed from such successive beam scans are exemplified in the illustrative graphs of FIGS. 5A through 5D. The arrow in each of the graphs represent the flight direction 38 substantially over the roadway 28 including the vehicles 23 through 26. Each line of the graph represents a scanned strip portion of the target area. The amplitudes of the lines are representative of the hit-to-hit range differential signaling such as that described in connection with the graph of FIG. 4b.

Figures 5A, 5C:
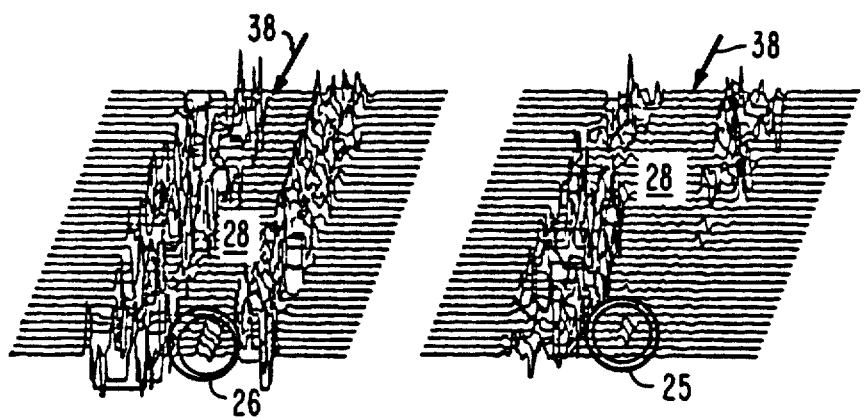
FIGS. 5A through 5D are exemplary illustrations of the laser beam scans of a topological scene similar to that depicted in the plan view of FIG. 2.
Figures 5B, 5D:
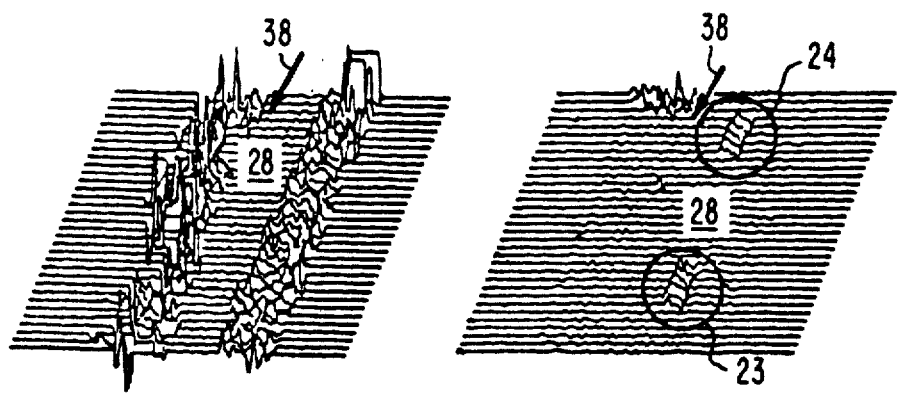

In each of the graphs 5A through 5D, the roadway ranged differential signaling is that portion which is in line with the flight direction arrow 38. The large amplitude perturbations on either side of the roadway represent the rows of trees 30. In the graph of FIG. 5A, the range differential signaling representative of the tank 26 is enclosed in a solid line circle. The graph of FIG. 5B represents that portion of the roadway between the tank 26 and the jeep 25 in which there are no ground moving vehicles. In graph 5C, the range differential signaling representing the jeep 25 is enclosed in the solid line circle with the same reference numeral. Similarly, in graph 5D, the range differential signaling of the plurality of scans representing the tanks 24 and 23 along the roadway 28 is enclosed in the solid line circles having the same corresponding reference numerals.

Figure 6:
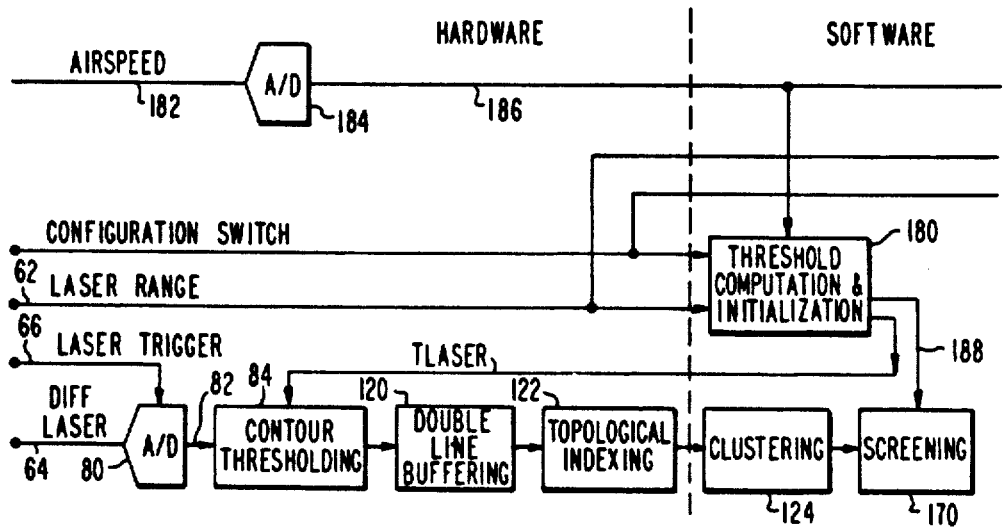
FIG. 6 is a functional block diagram schematic of a processor suitable for embodying the broad principles of the present invention.

In accordance with the present invention, the laser-based target discriminator includes a signal processing portion which may be embodied as that shown by the functional block diagram schematic of FIG. 6. Referring to FIG. 6, in the present embodiment, an analog-to-digital (A/D) converter 80 is included for digitizing the differential range laser signaling 64 at sampling times corresponding to the laser PRF as may be governed by the laser trigger signal 66, for example. The digitized differential range laser information 82 is provided to a contour thresholding function 84 for generating a first image map of the ground target area of interest by assigning values to the differential laser signals associated with each ground hit or image element of a plurality of scanned strips of the target area in accordance with a plurality of threshold settings. Preferably, the contour thresholding function 84 generates a binary image map by contour thresholding the range differential signals of each scanned strip of the target ground area. This is accomplished in the present embodiment of the function 84 by comparing the range differential signals 82 of each scan to a set of predetermined threshold values and setting the image elements of each scan (i.e. hits) to a binary state in accordance with the results of the comparisons.

Figure 9A:
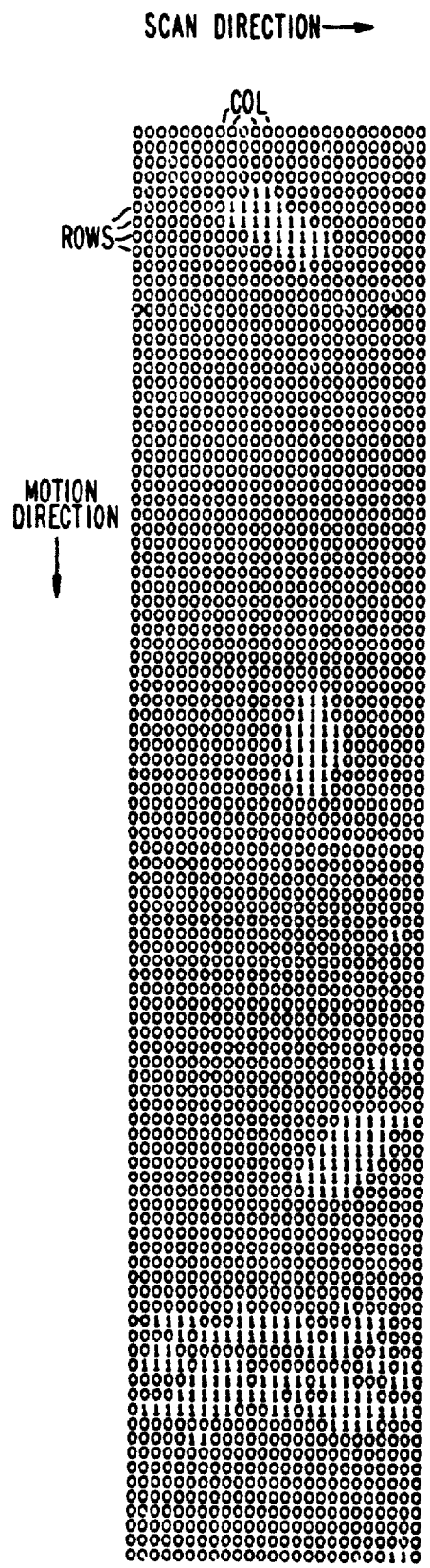
FIGS. 9A and 9B are examples of a binary image map and a topological image map, respectively, which may be formed by the processor embodiment depicted in FIGS. 6.

One technique of contour thresholding will be described in connection with the graphs b and c of FIG. 4. Referring to FIG. 4, the setting of a succession of image elements of a scan to one binary state, like that shown in graph c, for example, may be initiated upon determining by comparison that the value of a range differential signal of the scan falls within a threshold increment established by a first pair of predetermined threshold values T1 and T2. This initiation event is shown occurring in graph b of FIG. 4 at the image element or hit $h_n$. The termination of the setting of image elements to the one binary state occurs upon one of a number of predetermined events including: the determination by comparison that the value of a subsequent range differential signal of the same scan falls within a threshold increment established by a second pair of differential threshold values T3 and T4, such as that shown in graph b at hit $h_m$, for example. and the number of successive image elements being set to the one binary state reaches a predetermined maximum number, designated as TLASER in the graph b. Accordingly, the other image elements of the scan are set to the other binary state. In this fashion, the contour thresholding function forms a cluster of contiguous image elements set to the one binary state from the laser scanned information constituting the image area of the ground target of interest and this cluster is contrasted from the surrounding image elements which are set to the other binary state. A typical formed binary image map using the contour thresholding technique is shown in FIG. 9A.

An alternate contour thresholding technique which may be embodied in the function 84 will be described in connection with FIGS. 7 and 8. More particularly, the range differential signals of a corresponding succession of image elements of a scan are integrated according to this alternate technique in order to determine the image elements which are to be set to the one binary state. The other image elements of the scan are set to the other binary state. The initiation of the integration process occurs upon determining that the value of a range differential signal of a scan falls within a threshold increment established by a pair of predetermined threshold values T1 and T2, for example, and the termination of the integration process occurs upon one of a number of predetermined events including: the integrated value of the integrator reaching substantially zero, and the number of successive image elements included in the integration period reaching a predetermined maximum number.

Figure 7:
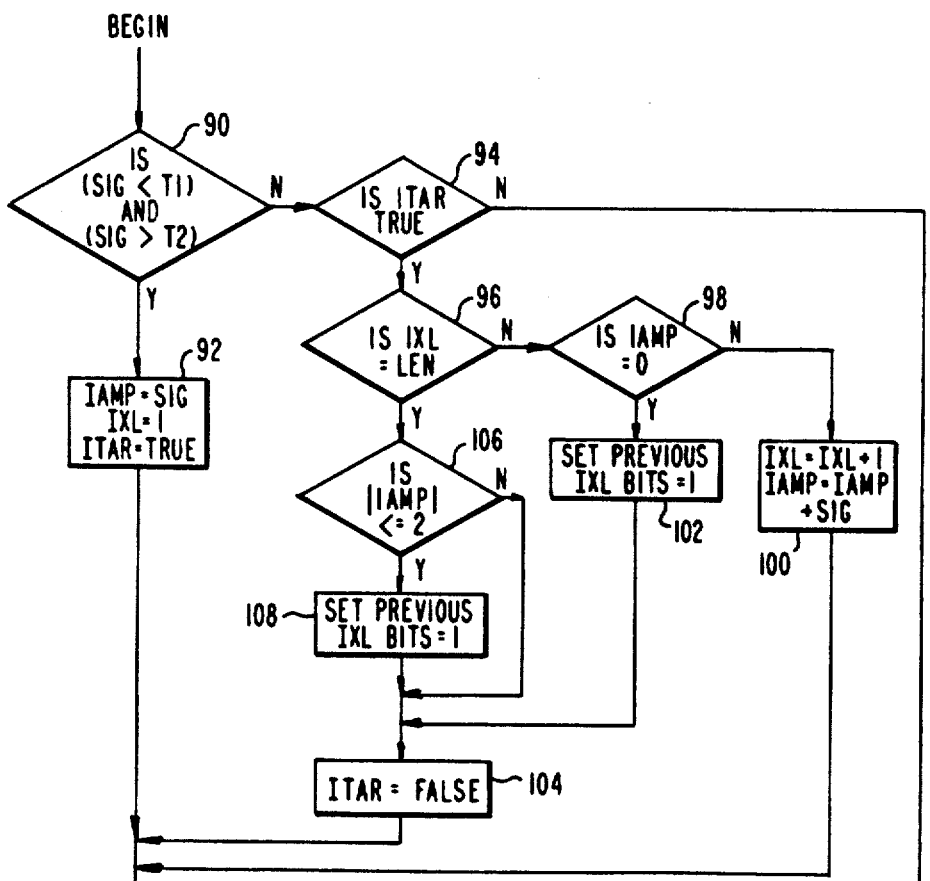
FIG. 7 is a diagram of a flow chart for embodying a suitable technique of contour thresholding for use in the processor embodiment depicted in FIG. 6.
Figure 8:
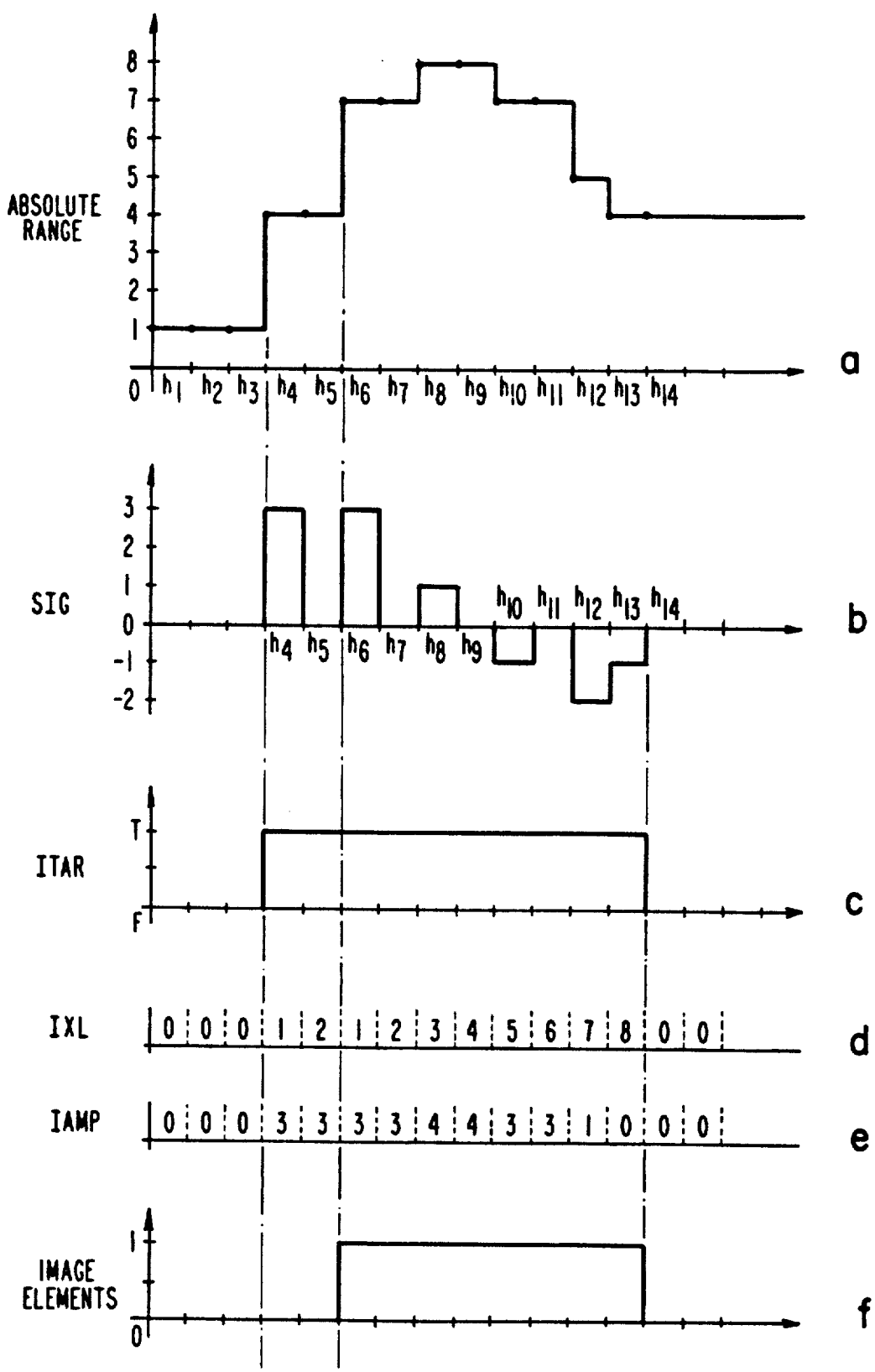
FIG. 8 depicts waveforms a through f for use in describing the operation of the technique used in the flow chart of FIG. 7.

FIG. 7 is a functional flow chart for illustrating the integration technique of contour thresholding and FIG. 8 depicts illustrative graphs for unmasking a target from clutter and terrain in accordance with the integration process of FIG. 7. The flow chart of FIG. 7 operates on the laser range differential signals of the image elements or hits of a scan. For example, in decisional block 90 a range differential signal denoted as SIG is compared with the threshold values T1 and T2 to determine if the amplitude thereof falls within the threshold increment between T1 and T2 (T1 being greater than T2). If the response to the decision block 90 is yes, the integrator, denoted as IAMP, is set to the present value of SIG, an accumulator denoted as IXL is set to 1, and a flag denoted as ITAR is set true in block 92 and thereafter, the flow chart is exited.

The same decision determination of block 90 is performed for successive range differential signals of the scan and when a successive range differential signal falls outside the threshold increment of T1 and T2, the functional path flows to the decisional block 94 wherein it is determined if the flag ITAR is set true. If not true, the flow chart is exited. If true, it is next determined if the accumulator IXL which is accumulating the image elements of the integration process has reached its maximum number, denoted as LEN, in block 96. If it has not reached maximum number, then the integration is continued at the decisional block 98 wherein it is determined if the integrator IAMP is substantially close to a zero value. If it is not, the integration process continues in block 100 incrementing the image element accumulator IXL and adding the present value of SIG to the accumulated integrator value IAMP. The flow chart is thereafter exited. If the value of IAMP is substantially close to zero or equal to zero as determined by the decisional block 98, then all of the image elements of the integration period are set to the one binary value in the block 102. Thereafter, the flag ITAR is set false in the block 104 and the flow chart is exited.

Referring back to the decisional block 96 should the value of the accumulator IXL reach its maximum number LEN, processing continues in the decisional block 106 wherein it is determined if the absolute value of the integrator |IAMP| is less than or equal to some predetermined number. In the present embodiment, the predetermined number of the decisional block 106 is set at 2. If affirmative, the image elements of the integration process are set to one in the block 108. Otherwise, nothing is done. In either case, the processing continues at block 104 where the flag ITAR is set false and the flow chart is exited.

An example of operation of the contour thresholding technique described in connection with the flow chart of FIG. 7 is exhibited by the graphs a through f of FIG. 8. The graphs depict a plurality of image elements or hits which constitute a portion of a scan. Graph a depicts the absolute range derived from the laser range measurement apparatus and graph b depicts the differential range signal SIG derived from hit-to-hit. Graphs c through f refer to labels previously described in connection with the flow chart of FIG. 7. The functional flow chart operates on the differential range signaling of graph b. Referring to graph b, at the hit $h_4$, the decisional block 90 of FIG. 7 determines that the amplitude of SIG is within the threshold increment and the flag ITAR is set true, the accumulator IXL is set to 1, and the integrator IAMP is set to the value of SIG as shown by the graphs c, d and e, respectively. At the hit $h_5$, the signal SIG is outside of the threshold increment causing the flow chart processing to continue through the decisional blocks 94, 96 and 98 winding up at the block 100 wherein the accumulator IXL is incremented to 2 and the present value of the integrator IAMP is incremented by the signal value SIG which in the instant case is zero, therefore the integrator value will remain the same, i.e. 3.

At hit $h_6$, the signal value SIG is again within the threshold increment as determined by the block 90 resulting in signal processing by the block 92 wherein the flag ITAR is set true, the accumulator IXL is set to 1, and the integrator IAMP is set to the instant signal value which is 3. Thereafter, at hit $h_7$, the signal is determined to be outside of the threshold increment again and the flow chart processing continues through decisional blocks 90, 94, 96 and 98 to block 100 wherein the integrator and accumulator updates are performed as described hereabove. Processing through the hits $h_8$ through $h_{12}$ continues in a similar manner with the results of the processing being displayed in the graphs c through e. However, at the hit $h_{14}$, the decisional block 98 establishes that the integrator IAMP is at zero value diverting the processing through the blocks 102 and 104 sequentially. The block 102 sets the image elements or hits of the integration period as determined by the accumulator IXL to one binary state as shown by the graph f. Thereafter, the flag ITAR is set false in the block 104 as shown in the graph c. Processing may continue through the instant scan and then be repeated from scan to scan for the plurality of scans constituting the target area. In this fashion, a binary image map similar to the one shown in FIG. 9A is formed.

FIG. 9A exemplifies a binary image map formed by the contour thresholding function 84 in connection with a plurality of laser scans of a target area. Each line of FIG. 9A represents a scan including twenty-four image elements or hits. Each hit increment has been digitized of either a "0" or a "1" binary state according to one of the contour thresholding techniques as described hereabove in connection with the contour thresholding function of block 84. The laser scan direction is from left to right and the aircraft motion is from top to bottom. The various clusters of "1"'s in the binary image map represent identified objects in the image scene. For example, the cluster of "1"'s at the top of the image map of FIG. 9A represent a tank, the cluster of "1"'s in the middle of the map may represent a truck, the third cluster from top to bottom may represent another tank, and the final cluster near the bottom of the map represents groupings of bushes.

Figure 9B:
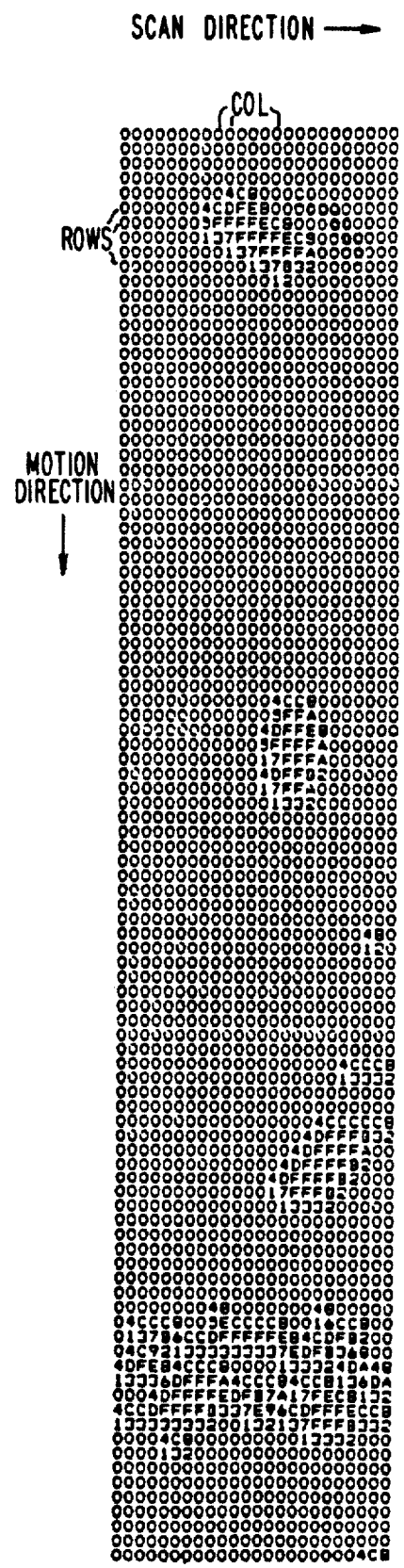

The next two blocks 120 and 122 following the contour thresholding function 84 of the processor depicted in FIG. 6 represent the functions of double-line buffering and topological indexing, respectively. The functional blocks 120 and 122 of the target discriminator processor operate to convert the binary image map into a second image map of indices corresponding to the image elements of the binary image map. An example of a converted second image map is shown in FIG. 9B. Each index of the second image map represents a code which is derived from a grouping of assigned values of the binary image map. Thus, the second image map comprises rows of index codes where adjacent rows respectively correspond to successive laser scans of the target area and each index code of a row corresponds to an image element of the area. Corresponding image elements of the adjacent rows form columns in the second image map.

More specifically, the functional block 120 buffers each pair of scanning rows of the binary image map from top to bottom, one pair at a time. The functional block 122 groups the binary values of the two image elements of one row or line of each pair with the binary values of the corresponding two-image elements of the other line of each pair in a sliding window fashion from one end of the pair of lines to the other to derive for each grouping an index representative of the hexadecimal code of the binary values thereof and accordingly, form a line of hexadecimal coded indices of the second image map for each adjacent line pair of the binary image map. This procedure is exemplified in the illustrations A through D of FIG. 10.

Referring to FIG. 10, the illustration of A shows corresponding portions of an adjacent line pair buffered by the block 120. The four elements framed are used to form the first index value of the corresponding line of index values of the second image map. For the present embodiment, the hexadecimal code of the framed four elements will be taken in the order as shown by the illustration B. Thus, as the window frame slides from left to right through the adjacent line pair of binary values, corresponding hexadecimal indices may be formed as that shown by the illustration of C to generate the corresponding line of indices exemplified by the illustration of D in FIG. 10. FIG. 9B exemplifies a topological image map which has been converted to hexadecimal indices from the binary values of the binary image map of FIG. 9A according to the method described hereabove in connection with the illustrations of FIG. 10.

The next functional block 124 in the order of functional blocks of the processor depicted in FIG. 6 includes a function for identifying clusters of image elements from the second or topological image map based on the derived codes of the indices thereof. In the instant embodiment, the clustering element 124 includes a decoding function for decoding the index codes of the second image map such as that shown in FIG. 9B, for example, to define a cluster by its image element edges. More specifically, the decoding function sequentially decodes the index codes of each row of the second image map to detect the image elements of the row corresponding to the leading and falling edges of a cluster and to detect the rows corresponding to the beginning and end of a cluster. An exemplary clustering technique is illustrated by the flow chart depicted in FIG. 11A and 11B. The technique depicted by the flow chart of FIGS. 11A and 11B assumes a topological index map such as that shown in FIG. 9B and includes a scanning process of each row of the topological image map going from left to right starting with the first row to analyze the topological indices in the columns thereof and also going from top to bottom to analyze the plurality of rows in a target image.

Figure 11A:
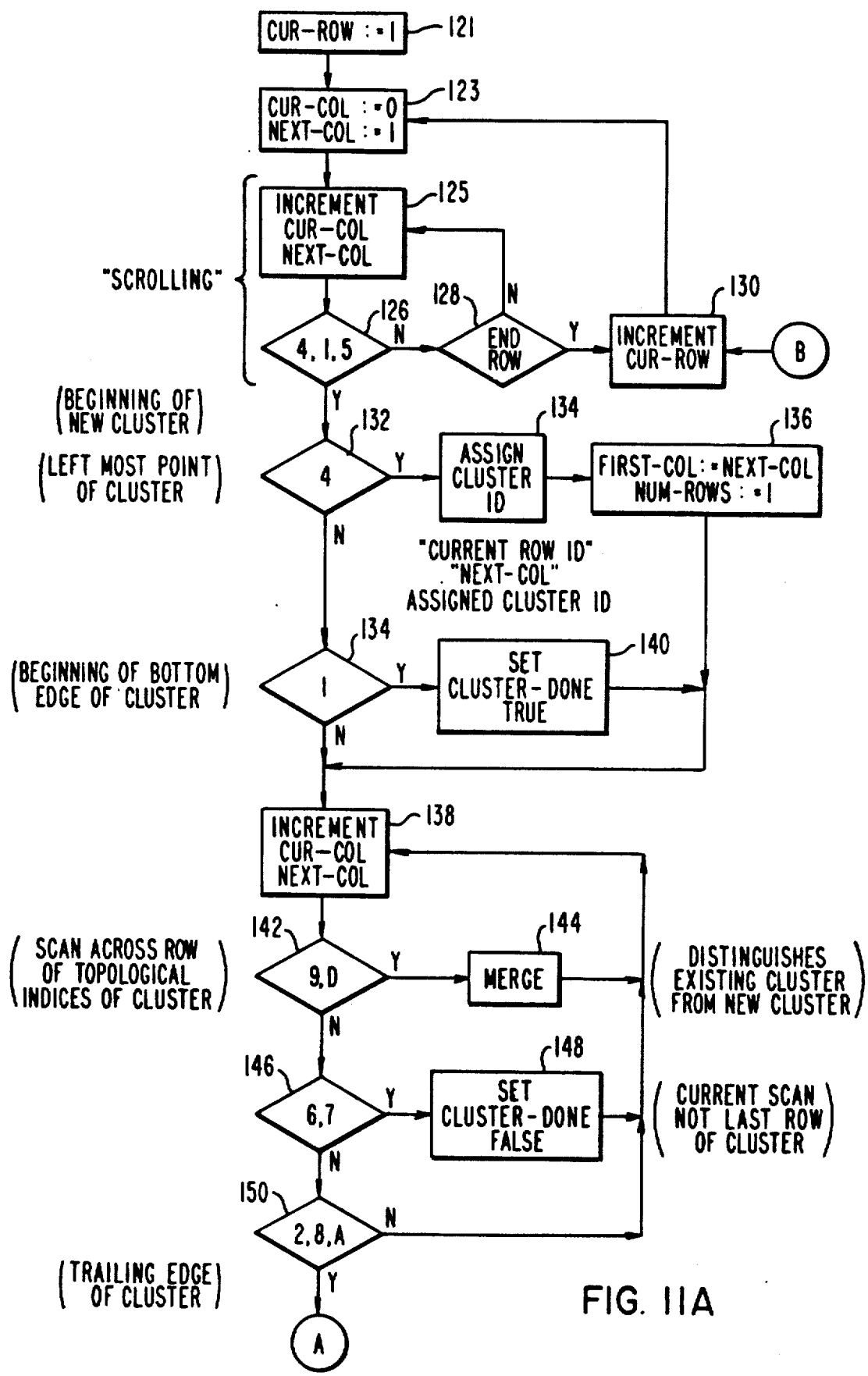
FIGS. 11A and 11B depict a functional flow chart which is used to describe a clustering technique for use in the processor embodiment of FIG. 6.
Figure 11B:
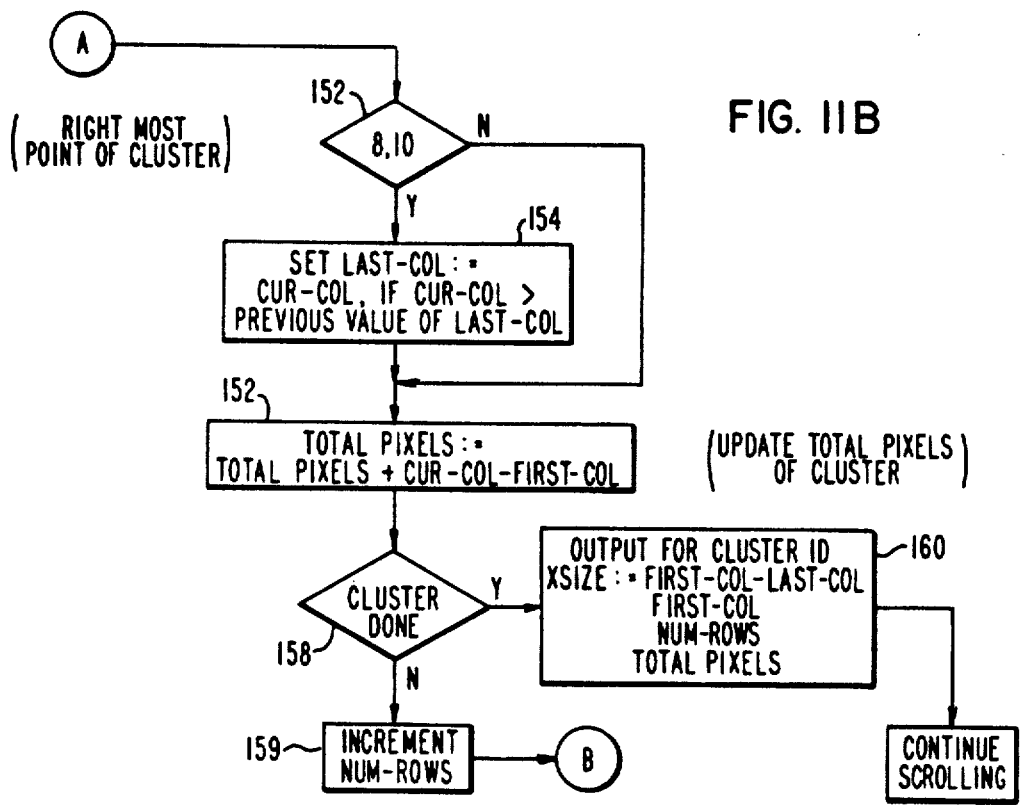

Referring to FIG. 11A, the clustering technique begins with setting the current row register, denoted as CUR_ROW, to 1 in block 121 which represents starting the analysis in the first row of the topological image map. Block 123 sets the registers denoted as CUR_COL and NEXT_COL to 0 and 1, respectively. These two registers refer to the current column and next column to be analyzed. Block 125 starts the scanning or scrolling process of analyzing the topological index of each image element of the current row of the map. The instant procedure defines the leading edge of a cluster by preselected hexadecimal codes, like 4, 1, or 5, for example. The decisional block 126 identifies if the hexadecimal code at the particular current column of the current row is one of the preselected leading edge codes. If not, the next column is analyzed by incrementing the current column and next column registers in block 125. This procedure is repeated until all of the indices in a row have been analyzed which is determined by the decisional block 128. If no leading edge code is identified in a particular row, the current row register is incremented in block 130 and processing is returned to the block 123 to scan the elements of the next row in sequence.

If one of the elements is identified in block 126 as having an index code equivalent to one of the leading edge codes (i.e. 4, 1, or 5), it is next determined if the identified code is either a 4 or a 1 utilizing the decisional blocks 132 and 134, respectively. If the code is identified as a hexadecimal 4, this is an indication of corresponding element is the leftmost point of a cluster. The identified cluster may be assigned a cluster ID in the block 134 which may include the matrix code of the current row and column ID. Thereafter, in block 136, a register denoted as FIRST_COL is set to the instant number contained in the NEXT_COL register and a register denoted as NUM_ROWS is set to 1. Processing is then continued at block 138. If the hexadecimal code is identified as a 1 in the decisional block 134, this is an indication that the particular row being scanned is the bottom edge of a cluster and the particular element being analyzed is the beginning of the row scan of the bottom edge. This being the case, a flag denoted as CLUSTER_DONE is set true in the block 140 and processing is continued in the functional block 138. If neither hexadecimal 4 nor hexadecimal 1 codes are identified in the decisional blocks 132 and 134, this is an indication that the code is hexadecimal 5 which indicates more than likely that the particular element being analyzed is the beginning of a cluster scan in the middle of the cluster. In any event, the processing also continues in the block 138.

At block 138, the instant algorithm has already determined that a cluster exists in the topological image map and is analyzing elements of a row scan within the cluster. With regard to the operational blocks 142 and 144, while it is true that a new cluster may always start with a hexadecimal 4, a hexadecimal 4 can appear more than once per cluster. Therefore, the instant algorithm should distinguish a new cluster from an existing cluster. In a previously identified cluster in the topological map, a junction may be found represented by other preselected hexadecimal codes, like a hexadecimal 9 or a hexadecimal D, for example. Thus, while scrolling after passing a leading edge (i.e. hexadecimal 1, 4, or 5), the occurrence of a hexadecimal 9 or D causes the two clusters to "merge" by merging their attributes. The decisional block 142 analyzes the index code of the image element and, if the code is a 9 or D, performs the merging operation in the block 144 with the processing being returned to the block 138 which selects the next image element in the row for analysis. Another area of concern occurs with identifying the end of a cluster. Even though a hexadecimal 1 has been determined as the leading edge of the cluster in a particular row, the current row scan may not be the last row of the current cluster. This may be indicated by the occurrence of still other preselected codes, like hexadecimal 6 or 7, for example, in the row scan. If a hex 6 or hex 7 is countered subsequent to a hex 1 during a row scan like in the decisional block of 146, for example, the CLUSTER_DONE flag is set false in the block 148 and processing is continued with the next image element of the row scan.

If the algorithm does not identify any of the hexadecimal codes of 9, D, 6, or 7 in scanning across the row of topological indices of a cluster, it next seeks to identify the trailing edge of a cluster by sensing hexadecimal codes of either 2, 8, or A, for example, in the decisional block 150. After having identified a trailing edge code of a cluster, the algorithm next determines, in the decisional block 152, if the trailing edge is the rightmost point of the cluster which may be indicated by a hexadecimal code of 8 or 10. Should this event exist, then in block 154, the Last_Column register is set equal to the current column register, if the current column value is greater than the previous value of the last column register and the CLUSTER_DONE flag is set true.

Next, in block 156, the total image elements or pixels of the identified cluster are accumulated in a total pixel count register by subtracting the current column value minus the first column value for each row of the cluster and accumulating these resulting numbers. Decisional block 158 determines if the particular row being analyzed is the last row of the identified cluster. If not, the register denoted as NUM_ROWS is incremented and the algorithm is returned to the processing status for analyzing the image elements of the next row (i.e. block 130). Should the CLUSTER_DONE flag be set, then the parameters of the cluster which have been measured during the processing of the algorithm described hereinabove are gathered in the functional block 160.

For the particular embodiment, the predefined cluster parameters include (1) the maximum dimension in the scan direction, denoted as XSIZE, which is determined by subtracting the contents of the last column register from the contents of the first column register, (2) the position of the cluster in the target image denoted as the value of the first column register, (3) the maximum dimension of the cluster in the motion direction, denoted as YSIZE, which is defined by the contents of the NUM_ROWS register, and (4) the total number of image elements or pixels in the cluster, denoted as PIXELS. These aforementioned parameters may be stored in a group of registers assigned to the identified cluster associated therewith (refer to Table 1).

TABLE 1

FLIGHT 16 PASS 11
VELOCITY + 807 FT/SEC ALTITUDE = 223 FT
NMAX = 52 NMIN = 21 XMAX = 15
XMIN = 4 YMAX = 8 YMIN = 2

| TARGET ID | PIXELS | YSIZE | YSIZE | |
|---|---|---|---|---|
| 6 | 1 | 1 | 1 | |
| 7 | 2 | 2 | 1 | |
| 9 | 29 | 9 | 6 | TRIGGER (TANK) |
| 12 | 28 | 5 | 7 | TRIGGER (TRUCK) |
| 13 | 1 | 1 | 1 | |
| 14 | 4 | 4 | 1 | |
| 3 | 38 | 10 | 6 | TRIGGER (TANK) |

The algorithm may then continue scrolling over the remainder of the rows of the image area to identify other cluster regions. In summary, the algorithm of the clustering function of block 124 as described in connection with the functional flow chart of FIGS. 11A and 11B essentially sequentially decodes the index codes of each row of the topological or second image map to detect the image elements of the row corresponding to the leading and falling edges of a cluster and to detect the rows corresponding to the beginning and end of a cluster. The algorithm includes the functions for processing the aforementioned detected information of an identified cluster to measure predefined parameters thereof, including the number of rows encompassing the cluster, the maximum number of image elements in a row of the rows of the cluster, and the total number of image elements of the cluster.

While the description above provides an understanding of a suitable embodiment for the clustering function 124, it should be understood that the foregoing algorithm is merely one example of a clustering technique and that other similar algorithms may also be used without deviating from the broad principles of the present invention.

A screening function 170 is included in the processor depicted in FIG. 6 for the purpose of comparing the measured target cluster parameters of each newly identified cluster to threshold values determined by the threshold computation function. This function intends to separate the bushes and jeeps from the desirable targets like tanks, for example (refer to FIG. 1). The cluster length, width and pixel count are compared to previously determined threshold values of the same for a variety of conditions including speed, altitude and aspect angles of the particular targets. If the result of the comparison is a declaration of target validity, then the appropriate command or quantity is generated for weapon delivery purposes. If the comparison shows the cluster not to be of interest, the cluster is dropped from further consideration. Table 2 found herebelow contains the results of a large number of tests of a particular tank with varied altitudes and aircraft velocity. The exemplary results of Table 2 may be used as the predetermined threshold values to perform the screening or target detection function in the screening function 170.

TABLE 2

Composite Tank Data

| Velocity, ft/sec | | Altitude, ft | | |
|---|---|---|---|---|
| | | 150 | 200 | 300 |
| 700 | NMIN | 43 | 32 | 20 |
| | NMAX | 71 | 57 | 41 |
| | XSIZMIN | 3 | 3 | 3 |
| | XSIXMAX | 8 | 8 | 8 |
| | YSIZMIN | 9 | 7 | 5 |
| | YSIZMAX | 19 | 15 | 10 |
| 800 | NMIN | 37 | 23 | 12 |
| | NMAX | 62 | 48 | 35 |
| | XSIZMIN | 3 | 3 | 2 |
| | XSIXMAX | 7 | 7 | 7 |
| | YSIZMIN | 9 | 7 | 5 |
| | YSIZMAX | 19 | 15 | 10 |
| 900 | NMIN | 21 | 16 | 12 |
| | NMAX | 58 | 50 | 34 |
| | XSIZMIN | 2 | 2 | 2 |
| | XSIXMAX | 7 | 6 | 6 |
| | YSIZMIN | 9 | 7 | 5 |
| | YSIZMAX | 19 | 14 | 10 |

Table 3 contains exemplary expressions for determining the threshold values used in the Screening function 170.

TABLE 3

Figure 12:
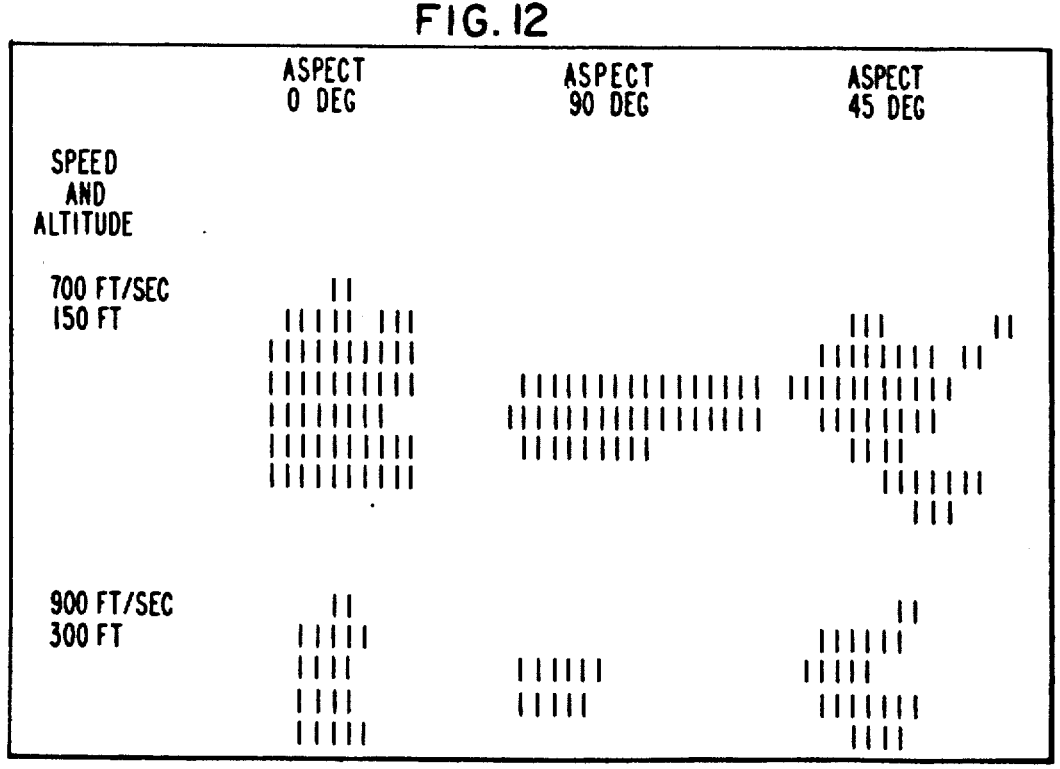
FIG. 12 depicts a plurality of binary image clusters changing in shape as a function of varying conditions of speed, altitude, and aspect angle.

NMIN := 99.0−0.10 * ALTITUDE (ft) − 0.070 * VELOCITY (ft/sec)
NMAX := 140.5−0.16 * ALTITUDE (ft) − 0.065 * VELOCITY (ft/sec)
ZSIZMIN:
IF (ALTITUDE (ft) + 1.50 * VELOCITY (ft/sec)) .GT. 1425 THEN
$\qquad$ YSIZMIN := 2.0
ELSE
$\qquad$ YSIZMIN := 3.0
YSIZMAX := 15.0−0.010 * VELOCITY (ft/sec)
YSIZMIN := 11.0−0.020 * ALTITUDE (ft)
TLASER := 30.0−0.067 * ALTITUDE (ft)
XSIZMAX := TLASER = 3.0
where:
NMIN, NMAX := minimum and maximum pixel counts, respectively
YSIZMIN, YSIZMAX := minimum and maximum target lengths, respectively
YSIZMIN, YSIZMAX := minimum and maximum target widths, respectively
TLASER := max target window width Examples of clusters for particular tank signature variations with speed and altitude of the aircraft are shown in FIG. 12. The threshold computation and initialization function 180 of the processor depicted in FIG. 6 accumulates the air speed measurement from the aircraft over signal line 182. This measurement may be digitized by a conventional analog-to-digital (A/D) converter 184 and supplied to the function 180 via signal line 186. The absolute range measurement may be determined by the range measurement apparatus described in connection with FIG. 3, and may also be accumulated via signal line 62 by the function 180. The function 180 communicates with the screening function 170 utilizing the signal lines of 188.

In summary, the screening function 170 may be utilized for storing predetermined cluster parameters of a known object and specific orientations thereof for correlation with the measured parameters of identified clusters of the image area provided by the clustering function 124 to discriminate the clusters corresponding to the known object from the identified clusters and determine the orientation thereof. The screening function 170 is not only capable of correlating the measured parameters of identified clusters of the image area with the stored cluster parameters of the known objects and their orientations to discriminate desired clusters from the identified clusters, but is also capable of determining the position of the desired clusters in the image scene for weapon delivery purposes in accordance with the scenario depicted in FIGS. 1 and 2.

It is understood that in another application such as that applied to a robotic arm in an automated factory environment, the screening function 170 is also capable of determining the orientation of each of the discriminated clusters in addition to the position thereof in the image scene to command the robotic arm in the proper orientation for a part pickup operation.

Figure 13:
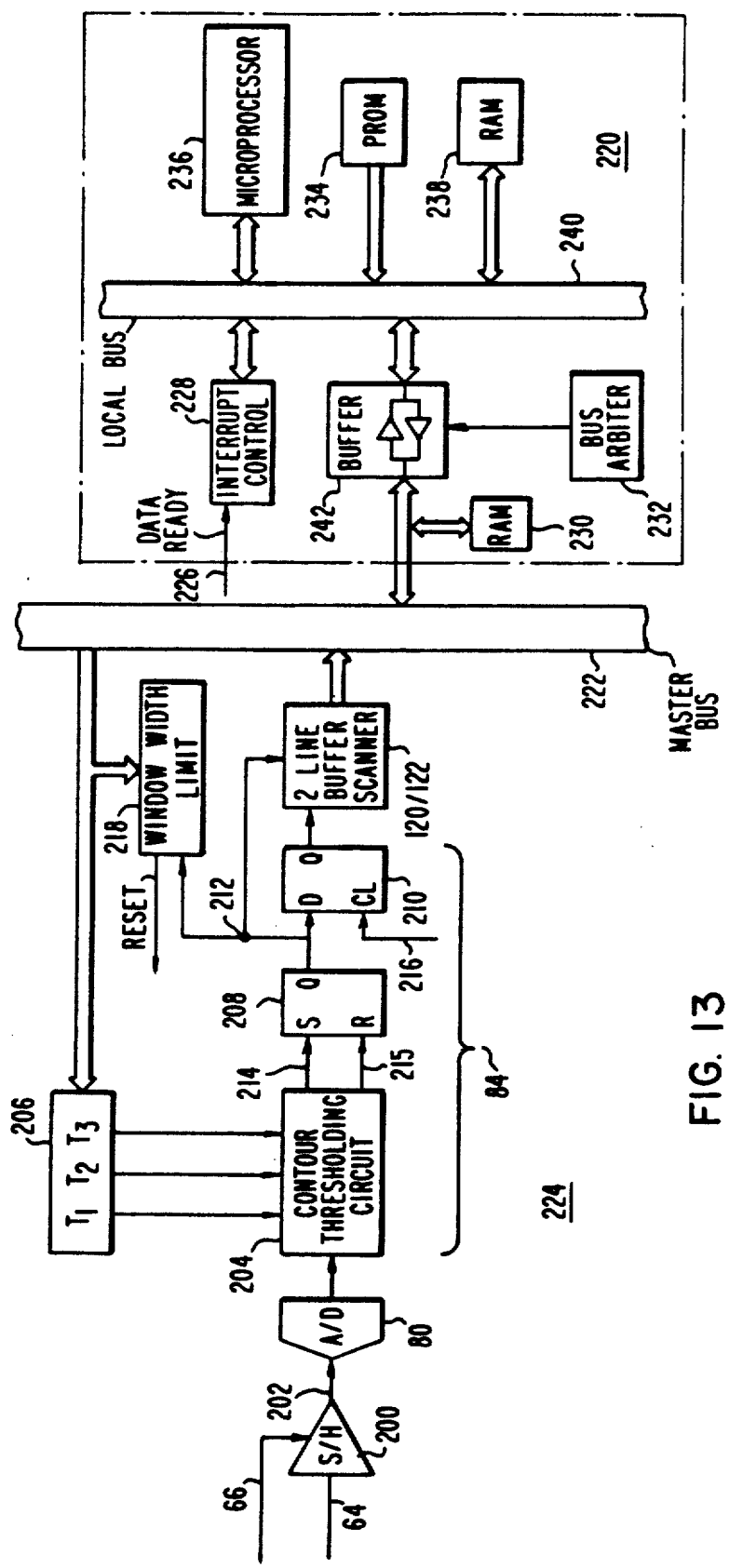
FIG. 13 depicts a circuit diagram schematic suitable for embodying the laser-based target discriminator processor as depicted in FIG. 6.

The schematic of a suitable circuit embodiment of the processor as described in connection with the functional block diagram of FIG. 6 is shown in FIG. 13. The differential range signal 64 generated by the range measuring apparatus may be sampled at time intervals corresponding to the PRF of the pulsed laser by a conventional sample-and-hold (S/H) circuit 200 which may be governed by the laser trigger signal 66. The sampled-data output signal 202 of the S/H converter 200 is digitized by the A/D converter 80 to provide an 8-bit digital word representative thereof to the contour thresholding function 84. A plurality of threshold settings T1, T2 and T3 is provided to the thresholding circuit 204 from digital buffers 206.

The contour thresholding function 84 comprises the contour thresholding circuit 204, a set/reset flip-flop 208 and a D-type flip-flop 210. The contour thresholding circuit 204 may comprise a plurality of digital comparators for comparing the sampled-data differential range digitized signal to the plurality of thresholds T1, T2 and T3. The output 212 of the flip-flop 202 is set true by the signal 214 from the circuit 204 for the sampled data range differential signal which exceeds the threshold T2, but not the threshold signal T1. The output of the D-type flip-flop 210 remains set to a "1" for as many image elements as established by the clock signal 216 during the time that the flip-flop 202 is in the set state. When the sampled-data range differential signal falls below the threshold T3 as determined by the circuit 204, the signal 215 resets the flip-flop 202 changing the state of the signal 212. Thereafter, subsequent image elements of the scanned row established by the output of the flip-flop 210 will be set at the "0" binary state.

A two-line buffer/scanner embodies the functions of the double-line buffering 120 and the topological indexing 122 of FIG. 6. The buffer scan 120/122 buffers one line of the binary image map and as the second line is being formed by the circuitry constituting the contour thresholding function 84, it performs the sliding window function as described in connection with the illustrations of FIG. 10 hereabove to form the 4-bit hexadecimal codes of the topological index map. The 4-bit hex codes are provided from the buffer/scanner 120/122 to a microprocessor system 220 utilizing a master bus structure 222.

The master bus structure 222 permits bidirectional flow of information between the input data processing circuitry 224 described hereabove and the microprocessor system 220. For example, as each of the hex codes are formed by the buffer scanner 120/122 a data ready interrupt signal 226 may be provided to an interrupt control circuit 228 of the microprocessor 220 and the hex code associated therewith is presented to the master bus 222. Upon receiving the interrupt 226, the microprocessor system 220 may access the bus 222 to accumulate the hex codes of the topological map in a random access memory like that shown at 230, for example. A conventional bus arbiter 232 may be utilized to govern the data I/0 over the master bus 222.

A programmed memory 234 may contain the programs to operate a microprocessor 236 in accordance with the clustering and screening functions 124 and 170, respectively as described in connection with the functional embodiment of FIG. 6. A random access memory (RAM) 238 may be utilized to store the intermediate and final target discriminator data being formed by the aforementioned functions. A local bus 240 may permit data exchange between the modules 230, 234, 236 and 238 as governed by the bus arbiter 232 and the interrupt controller 228. Buffer circuits 242 may be included to buffer the signal exchange between the master bus 222 and the local bus 240.

The thresholds T1, T2 and T3 which are stored in the buffer memories 206 may be updated from time to time by the microprocessor system 220 via the master bus 222. In addition, the window width limit of the laser scanning element may be stored in the buffer memory 218 and may be used to reset the flip-flop 202 at times. The contents of register 218 may also be updated by the microprocessor 220 from time to time via the master bus 222.

We claim:

1. A laser-based target discriminator system including: means for transmitting and sensing a pulsed laser beam; means for scanning said pulsed laser beam a plurality of times across an image area, said beam scans covering different juxtaposed strip portions of said image area; means for deriving differential signals from sensed information of successive laser pulse echoes of each scan, each differential signal corresponding to an image element of a scan, and means for processing said differential signals comprising:

means for generating a first image map of said image area by assigning values to said differential signals associated with each image element of the plurality of scans of said image area in accordance with a plurality of threshold settings;

means for converting said first image map into a second image map of indices corresponding to the image elements of the first image map, each index of said second image map representing a code which is derived from a grouping of assigned values of said first image map;

means for identifying clusters of contiguous image elements from said second map based on the derived codes of the indices thereof;

means for measuring predefined parameters of each identified cluster; and means for discriminating desired clusters from the identified clusters based on the measured parameters thereof, whereby the desired clusters are representative image objects of potential targets in the image area.

2. The laser-based target discriminator system in accordance with claim 1 wherein:

the deriving means includes means for deriving range differential signals from sensed range information of successive laser pulse echoes of each scan, each range differential signal corresponding to an image element of a scan, each scan of range differential signals being representative of the changing contour of its corresponding strip portion of the image area; and the converting means includes means for converting the first image map into a second image map of topological index codes corresponding to the image elements of the first image map, each topological index code of the second image map being derived from a grouping of assigned values of said first image map.

3. The laser-based target discriminator system in accordance with claim 2 wherein the generating means includes means for generating a binary image map by contour thresholding the range differential signals of each scan of the image area.

4. The laser-based target discriminator system in accordance with claim 3 wherein the generating means includes means for comparing the range differential signals of each scan to a set of predetermined threshold values and for setting the image elements of each scan to a binary state in accordance with results of said comparisons.

5. The laser-based target discriminator system in accordance with claim 4 wherein the comparing and setting means includes: first means for initiating the setting of a succession of image elements of a scan to one binary state upon determining by comparison that the value of a range differential signal of the scan falls within a threshold increment established by a first pair of predetermined threshold means and for terminating said setting of image elements to the one binary state upon the occurrence of one of a number of predetermined events including: the determination by comparison that the value of a subsequent range differential signal of the scan falls within a threshold increment established by a second pair of predetermined threshold values, and the number of successive image elements set to the one binary state reaching a predetermined maximum number; and second means for setting other image elements to the other binary state, whereby a cluster of contiguous image elements set to the one binary state may be formed from the plurality of laser scans constituting the image area and is contrasted from the surrounding image elements which are set to the other binary state.

6. The laser-based target discriminator system in accordance with claim 3 wherein the generating means includes means for integrating the range differential signals of a corresponding succession of image elements of a scan and for conditionally setting said succession of image elements to one binary state and other image elements of the scan to the other binary state.

7. The laser-based target discriminator system in accordance with claim 6 wherein the generating means includes means for initiating the integration of the integrating means upon determining that the value of a range differential signal of the scan falls within a threshold increment established by a pair of predetermined threshold values and for terminating the integration of the integrating means upon the occurrence of one of a number of predetermined events including: the integrated value of the integrator reaching substantially zero, and the number of successive image elements included in the integration period reaching a predetermined maximum number.

8. The laser-based target discriminator system in accordance with claim 1 wherein the generating means includes means for assigning a binary value to each image element of each laser scan of the image area as a function of the values of the differential signals thereof to form a binary image map comprising a plurality of lines of binary values, each line corresponding to a laser scan and each binary value representing an image element thereof; and wherein the converting means includes means for processing adjacent line pairs of said binary image map to form each line of index codes of said second image map.

9. The laser-based target discriminator system in accordance with claim 8 wherein the conversion processing means includes means for grouping the binary values of two image elements of one line of each pair with the binary values of the corresponding two image elements of the other line of each pair in a sliding window fashion from one end of the pair of lines to the other to derive for each grouping an index representative of the hexadecimal code of the binary values thereof to form a line of hexadecimal coded indices of the second image map for each adjacent line pair of the binary image map.

10. The laser-based target discriminator system in accordance with claim 1 wherein the identifying means includes means for decoding the index codes of the second image map to define a cluster by its image element edges.

11. The laser-based target discriminator system in accordance with claim 10 wherein the second image map comprises rows of index codes, adjacent rows respectively corresponding to successive laser scans of the image area and each index code of a row corresponding to an image element of the image area, corresponding image elements of the adjacent rows forming columns of the second image map; wherein the decoding means includes means for sequentially decoding the index codes of each row of the second image map to detect the image elements of the row corresponding to the leading and falling edges of a cluster and to detect the rows corresponding to the beginning and end of a cluster and wherein the measuring means includes means for processing the aforementioned detected information of an identified cluster to measure predefined parameters thereof including the number of rows encompassing the cluster, the maximum number of image elements in a row of the rows of the cluster, and the total number of image elements of the cluster.

12. The laser-based target discriminator system in accordance with claim 11 including means for storing predetermined cluster parameters of known objects and specific orientations thereof; and wherein the discriminating means includes means for correlating the measured parameters of identified clusters of the image area with the stored cluster parameters of said known objects and their orientations to discriminate desired clusters from the identified clusters and determine the orientations of each discriminated cluster.

13. The laser-based target discriminator system in accordance with claim 11 including means for storing predetermined cluster parameters of a known object and specific orientations thereof; and wherein the discriminating means includes means for correlating the measured parameters of identified clusters of the image area with the stored cluster parameters of said known object and its orientation to discriminate the clusters corresponding to the known object from the identified clusters and determine the orientation thereof.

14. The laser-based target discriminator system in accordance with claim 11 including means for storing predetermined cluster parameters of at least one known object; and wherein the discriminating means includes means for correlating the measured parameters of identified clusters of the image area with the stored cluster parameters to discriminate the cluster corresponding to said known object and determine the position thereof in the image scene.

* * * * *